United States Patent
Hamada

(10) Patent No.: US 11,483,450 B2
(45) Date of Patent: Oct. 25, 2022

(54) IMAGE FORMING APPARATUS AND IMAGE READING APPARATUS

(71) Applicant: CANON KABUSHIKI KAISHA, Tokyo (JP)

(72) Inventor: Shuhei Hamada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/315,466

(22) Filed: May 10, 2021

(65) Prior Publication Data
US 2021/0360123 A1 Nov. 18, 2021

(30) Foreign Application Priority Data
May 18, 2020 (JP) .............................. JP2020-086905

(51) Int. Cl.
*H04N 1/40* (2006.01)
*H04N 1/00* (2006.01)

(52) U.S. Cl.
CPC ..... *H04N 1/40087* (2013.01); *H04N 1/00588* (2013.01); *H04N 2201/0081* (2013.01); *H04N 2201/0082* (2013.01)

(58) Field of Classification Search
CPC ............ H04N 1/4078; H04N 1/00087; H04N 2201/0082; H04N 1/00; H04N 1/00031; H04N 1/00588; H04N 1/40037; H04N 1/00002; H04N 1/00015; H04N 1/00997; H04N 1/0283; H04N 1/1135; H04N 1/40031; H04N 1/486; H04N 1/60; H04N 1/6008; H04N 1/6033; H04N 1/00034; H04N 1/00045; H04N 1/00795; H04N 1/00925; H04N 1/32122; H04N 1/40087; H04N 1/4015; H04N 1/407; H04N 1/603; H04N 1/6041; H04N 1/6097; H04N 2201/0081; H04N 2201/3204; H04N 2201/3276; B41J 29/393; B41J 2/2132;
(Continued)

(56) References Cited

U.S. PATENT DOCUMENTS 5,835,235 A * 11/1998 Goto .................... H04N 1/4072
  358/406
7,912,393 B2 * 3/2011 Yamada ............. G03G 15/5058
  399/72
(Continued)

FOREIGN PATENT DOCUMENTS

JP  2012-053089 A  3/2012
JP  5423620 B2  2/2014

*Primary Examiner* — Negussie Worku
(74) *Attorney, Agent, or Firm* — Venable LLP

(57) ABSTRACT

An image forming apparatus includes: an image forming unit configured to form a reference image, and a plurality of test images; a conveying unit configured to convey the sheet; a reading unit configured to read the sheet, and output read data, the reading unit including a plurality of light-receiving elements disposed along a direction orthogonal to a conveyance direction of the sheet; and a controller configured to: determine a direction in which the plurality of test images are disposed based on read data related to the reference image; determine test image read data related to test image regions corresponding to each of the plurality of test images from the read data based on the direction; and control a density of an image to be formed by the image forming unit based on the test image read data.

7 Claims, 10 Drawing Sheets

(58) Field of Classification Search
CPC ...... B41J 2/04536; B41J 2/04586; B41J 3/54; G06K 15/02; G06K 15/027
USPC ........................................................ 358/1.15
See application file for complete search history.

(56) References Cited

U.S. PATENT DOCUMENTS

| | | | |
|---|---|---|---|
| 8,831,471 B2* | 9/2014 | Sato | G03G 21/10 |
| | | | 399/101 |
| 8,948,631 B2* | 2/2015 | Honda | G03G 15/0178 |
| | | | 399/49 |
| 8,964,246 B2 | 2/2015 | Sakatani | |
| 2008/0145079 A1* | 6/2008 | Cho | G03G 15/5058 |
| | | | 399/60 |
| 2012/0050771 A1 | 3/2012 | Sakatani | |
| 2013/0183047 A1* | 7/2013 | Mochizuki | G03G 15/5062 |
| | | | 399/15 |
| 2016/0050339 A1* | 2/2016 | Tanaka | H04N 1/40037 |
| | | | 358/1.9 |
| 2016/0286093 A1* | 9/2016 | Negishi | G03G 15/5058 |
| 2017/0048423 A1* | 2/2017 | Itagaki | H04N 1/00058 |
| 2017/0054878 A1* | 2/2017 | Takemura | H04N 1/02895 |
| 2017/0108808 A1* | 4/2017 | Matsue | G03G 15/5058 |
| 2018/0150010 A1* | 5/2018 | Sone | G03G 15/1655 |
| 2018/0359380 A1* | 12/2018 | Itagaki | H04N 1/00588 |

* cited by examiner

F I G. 1
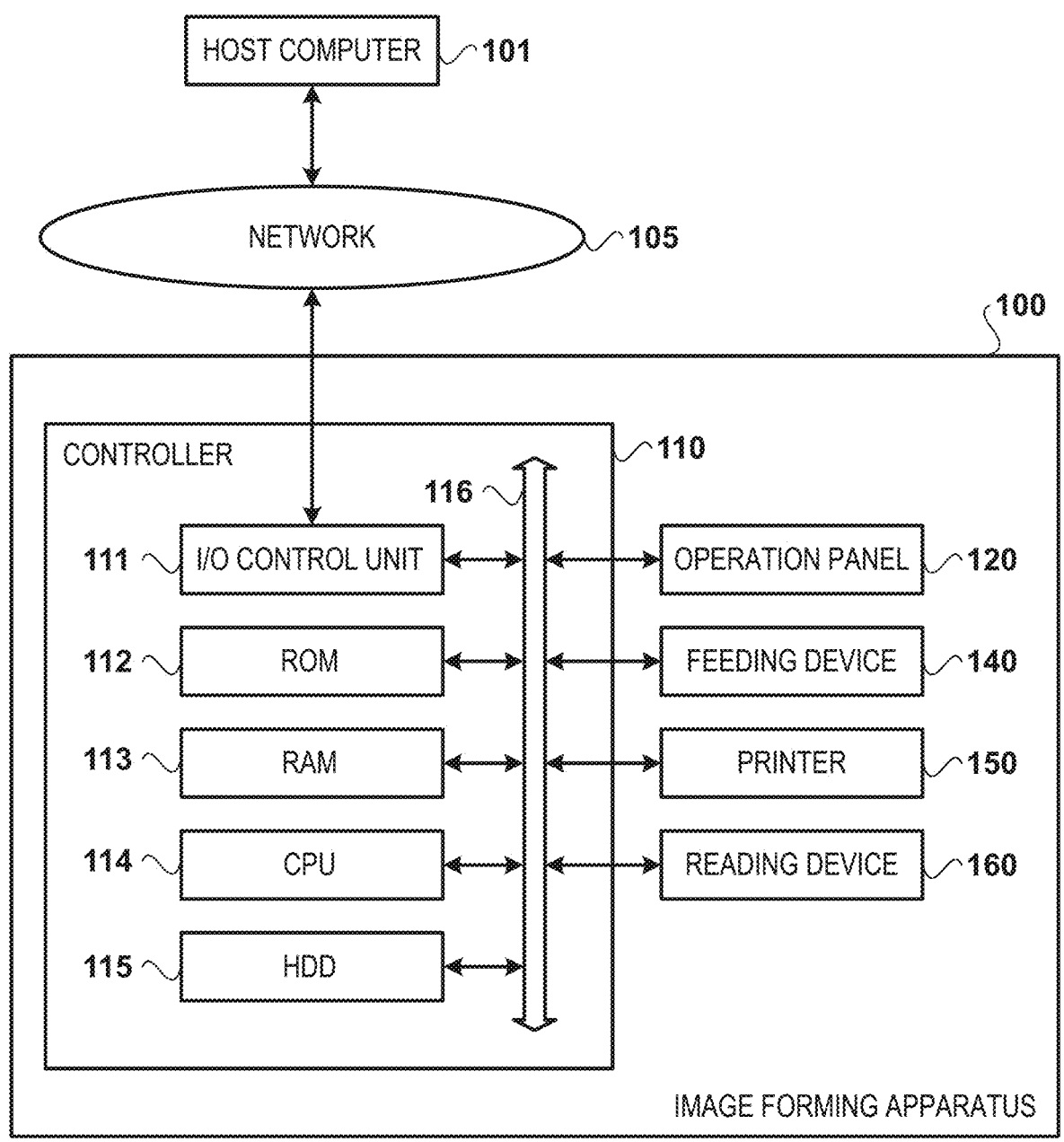

FIG. 8A
FIG. 8B
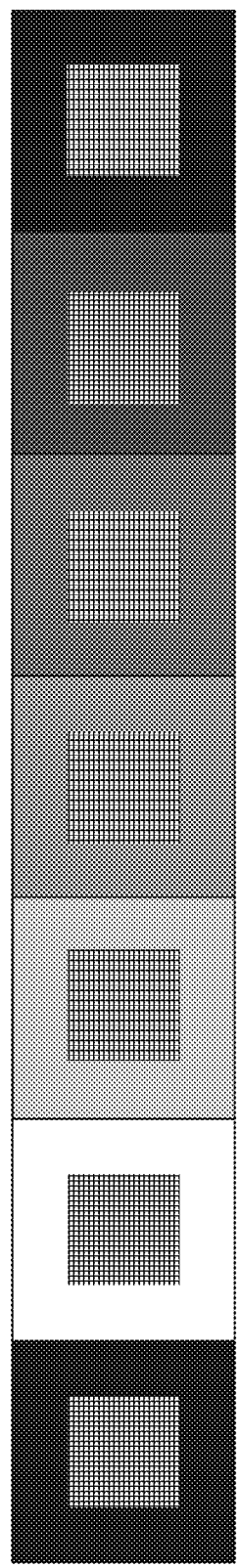
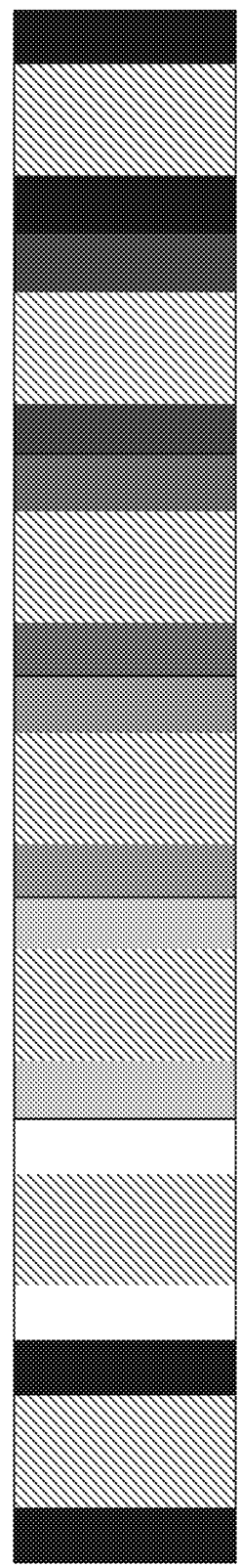

IMAGE FORMING APPARATUS AND IMAGE READING APPARATUS

BACKGROUND OF THE INVENTION

Field of the Invention

The present invention relates to a technique for reading an image formed on a sheet for an image stabilization control.

Description of the Related Art

In an image forming apparatus that forms images via an electrophotographic process, the density of the output image may be changed by changes in the characteristics of the charging, development, and transfer processes due to change over time or environmental changes. To minimize or prevent changes in density, the image forming apparatus executes image stabilization control. In image stabilization control, the image forming apparatus forms a density patch on a photosensitive member or an intermediate transfer belt, for example, and controls the image forming conditions to give an output image with the appropriate density on the basis of a density patch detection result obtained by an optical sensor.

US-2012-0050771 discloses a configuration, in which image stabilization control is performed by transferring and fixing a density patch on a sheet and detecting the density patch fixed to the sheet via an optical sensor. By controlling the image forming conditions on the basis of the detection result of the fixed density patch, the effects of transferring and fixing to the sheet can be taken into consideration when executing image stabilization control.

When an optical sensor reads a density patch formed on a sheet, reflected light reflected at the area around the density patch may be incident on the optical sensor and cause a reading error-inducing phenomenon known as "flare". To suppress the effects of flare, image stabilization control needs to be executed using only read values of the central region of the density patch. However, in a case where the density patch is inclined with respect to the conveyance direction of the sheet, light reflected at the area around the density patch is incident on the optical sensor, and the effects of flare are experienced.

SUMMARY OF THE INVENTION

According to a present disclosure, an image forming apparatus includes: an image forming unit configured to form (1) an image, (2) a reference image, and (3) a plurality of test images of different density on a same sheet, the reference image and the plurality of test images being disposed along a predetermined direction; a conveying unit configured to convey the sheet; a reading unit configured to read the sheet conveyed by the conveying unit, and output read data, the reading unit including a plurality of light-receiving elements disposed along a direction orthogonal to a conveyance direction in which the sheet is conveyed by the conveying unit; and a controller configured to: determine a direction in which the plurality of test images are disposed based on read data related to the reference image; determine test image read data related to test image regions corresponding to each of the plurality of test images from the read data outputted by the reading unit based on the direction; and control a density of an image to be formed by the image forming unit based on the test image read data.

Further features of the present invention will become apparent from the following description of exemplary embodiments with reference to the attached drawings.

BRIEF DESCRIPTION OF THE DRAWINGS

FIG. 1 is a functional block diagram of a printing system according to an embodiment.

FIG. 8A is an explanatory diagram of a central region used in calculating the average luminance value.

FIG. 8B is an explanatory diagram of a region stored in memory.

DESCRIPTION OF THE EMBODIMENTS

Figure 2:
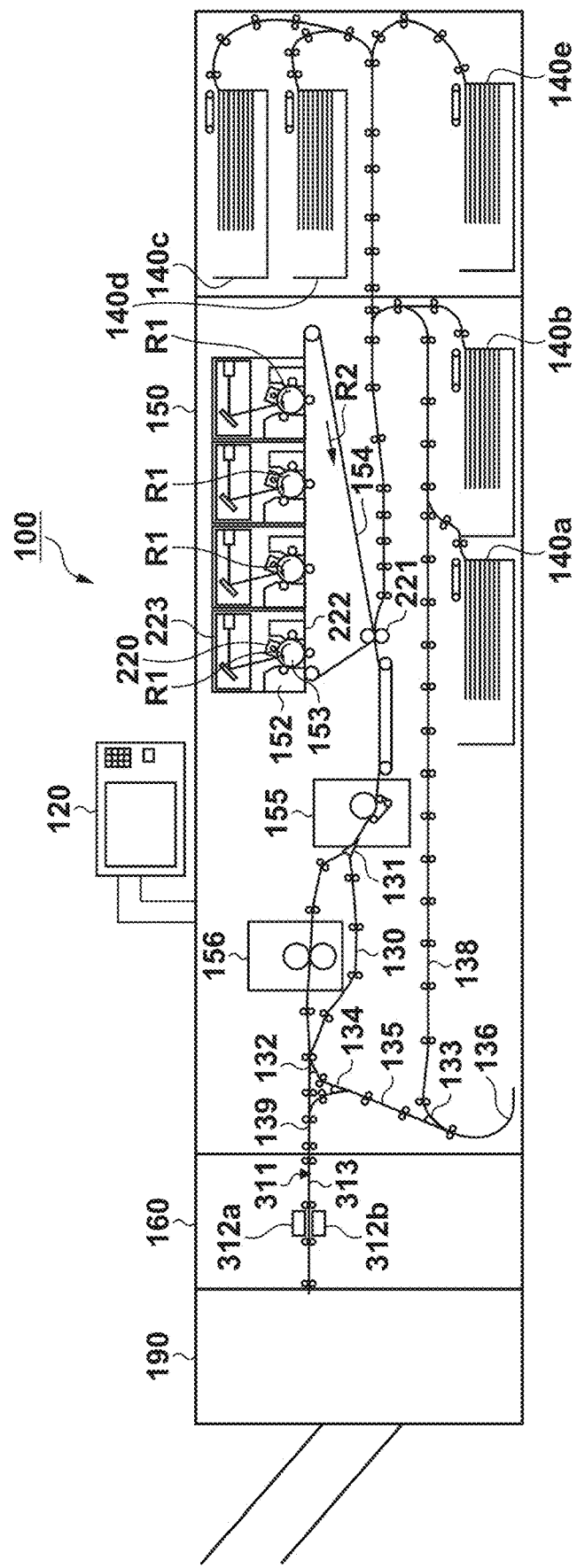
FIG. 2 is a configuration diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

FIG. 1 is a functional block diagram of a printing system including an image forming apparatus 100. The printing system includes the image forming apparatus 100 and a host computer 101. The image forming apparatus 100 and the host computer 101 are able to communicate with one another via a network 105. The network 105 is a local area network (LAN) or a wide-area network (WAN), for example. In FIG. 1, a single image forming apparatus 100 and a single host computer 101 are connected via the network 105. However, a plurality of image forming apparatuses 100 and a plurality of host computers 101 may be connected via the network 105.

The host computer 101 transmits print jobs to the image forming apparatus 100 via the network 105. The print job contains various information required for printing, such as image data of the image to be formed, the type of sheet to be printed on, the number of sheets to be printed, double-side printing or single-sided printing, and the like.

The image forming apparatus 100 forms an image on a sheet on the basis of a print job received from the host computer 101. The image forming apparatus 100 includes a controller 110, an operation panel 120, a feeding device 140, a printer 150, and a reading device 160. These units are able to communicate with one another via a system bus 116.

A ROM 112 is a non-volatile memory of the controller 110, and stores various control programs. A RAM 113 is volatile memory and functions as system working memory that reads out and stores a control program stored on the ROM 112. A CPU 114 executes a control program read out by the RAM 113 and comprehensively controls the entire image forming apparatus 100. A HDD 115 is a large-capacity storage device. The HDD 115 stores various data such as control programs and image data used in image forming processing (printing processing). An I/O control unit 111 is an interface for communication with the host computer 101 and the like via the network 105. Note that the functional blocks in the controller 110 are also able to communicate with one another via the system bus 116.

The operation panel 120 provides a user interface and includes an operation button, a ten key, a liquid crystal display, and the like. An operator can operate the image forming apparatus 100 via the operation panel 120 and determine the status of the image forming apparatus 100 from the information displayed on the operation panel 120.

The feeding device 140 includes a plurality of feeding units for housing sheets and feeds sheets in the feeding units to the printer 150. The printer 150 forms an image on a sheet fed by the feeding device 140 on the basis of image data. The configuration of the printer 150 will be described in detail below with reference to FIG. 2. The reading device 160 reads the surface of a sheet and outputs read data, i.e., image data, to the controller 110.

FIG. 2 is a configuration diagram of the image forming apparatus 100. The image forming apparatus 100 includes the feeding device 140, the printer 150, the reading device 160, and a finisher 190. The finisher 190 is a post-processing apparatus that executes post-processing on the print article of the printer 150. The finisher 190 executes stapling, cutting, sorting, or similar processing on a plurality of print articles, for example.

The printer 150 is provided with four image forming units 222 for forming images of yellow, magenta, cyan, and black. The image forming units 222 share the same basic configuration. A photosensitive member 153 of the image forming units 222 is rotationally driven in the direction of arrow R1 when forming an image. A charging device 220 charges the surface of the photosensitive member 153. An exposure device 223 forms an electrostatic latent image on the photosensitive member 153 by exposing the photosensitive member 153 to light on the basis of the image data of the image to be formed. A developing device 152 develops the electrostatic latent image of the photosensitive member 153 using a developing agent (toner). In this manner, the electrostatic latent image of the photosensitive member 153 is developed and an image is formed on the photosensitive member 153.

An intermediate transfer belt 154 is rotationally driven in the direction of arrow R2 when forming an image. Each image formed by the image forming units 222 is transferred to the intermediate transfer belt 154. Note that by transferring the images formed by the image forming units 222 on top of each other on the intermediate transfer belt 154, a full color image can be formed on the intermediate transfer belt 154. The image transferred to the intermediate transfer belt 154 is conveyed to a position opposite a transfer roller 221.

The feeding device 140 includes feeding units 140a, 140b, 140c, 140d, and 140e for housing sheets. The feeding device 140 feeds a sheet from any of the feeding units to the printer 150. The printer 150 conveys a fed sheet to a position opposite the transfer roller 221. The transfer roller 221 transfers an image on the intermediate transfer belt 154 to a sheet.

The printer 150 includes a first fixing device 155 and a second fixing device 156 that fix an image on a sheet by heating and pressing the image transferred to the sheet. The first fixing device 155 is provided with a fixing roller with a heater inside and a pressing belt for pressing the sheet against the fixing roller. The roller and belt are driven by a motor that is not illustrated and convey a sheet. The second fixing device 156 is disposed downstream from the first fixing device 155 in the conveyance direction of the sheet. The second fixing device 156 is provided to increase the gloss of the image on the sheet having passed the first fixing device 155 or to ensure the image is fixed. The second fixing device 156 is provided with a fixing roller with a heater inside and a pressure roller with a heater inside. Depending on the type of sheet, a usage of the second fixing device 156 may not be necessary. In this case, a sheet is conveyed to a conveyance path 130 without passing through the second fixing device 156. A flapper 131 switches between guiding a sheet to the conveyance path 130 and guiding a sheet to the second fixing device 156.

A flapper 132 switches between guiding a sheet to a conveyance path 135 and guiding a sheet to a discharge path 139. The flapper 132 guides a sheet on which an image is formed on a first surface to the conveyance path 135 when double-sided printing mode is active. Also, the flapper 132 guides a sheet on which an image is formed on a first surface to the discharge path 139 when face-up discharge mode is active. Furthermore, the flapper 132 guides a sheet on which an image is formed on a first surface to the conveyance path 135 when face-down discharge mode is active.

A sheet conveyed to the conveyance path 135 is conveyed to an inverting section 136. After a sheet is conveyed to the inverting section 136, the conveyance direction is inverted. Then, a flapper 133 switches between guiding the sheet from the inverting section 136 to a conveyance path 138 and guiding the sheet from the inverting section 136 to the conveyance path 135. The flapper 133 guides a sheet to the conveyance path 138 when double-sided printing mode is active, for example. Also, the flapper 133 guides a sheet switched back to the conveyance path 135 when face-down discharge mode is active, for example. A sheet conveyed to the conveyance path 135 by the flapper 133 is guided to the discharge path 139 by a flapper 134. A sheet conveyed to the conveyance path 138 by the flapper 133 is again conveyed to a position opposite the transfer roller 221, where an image is formed on both sides of the sheet.

A sheet guided to the discharge route 139 is conveyed along a conveyance path 313 of the reading device 160. A document detection sensor 311 of the reading device 160 detects the leading end in the conveyance direction of a test sheet conveyed along the conveyance path 313. The document detection sensor 311 is an optical sensor including a light-emitting element and a light-receiving element, for example. A line sensor unit 312a reads one surface of the sheet, and a line sensor unit 312b reads the other surface of the sheet. Note that the controller 110 controls the reading timings of the line sensor units 312a and 312b on the basis of the detection timings of the leading end of the sheet obtained by the document detection sensor 311.

Figure 3:
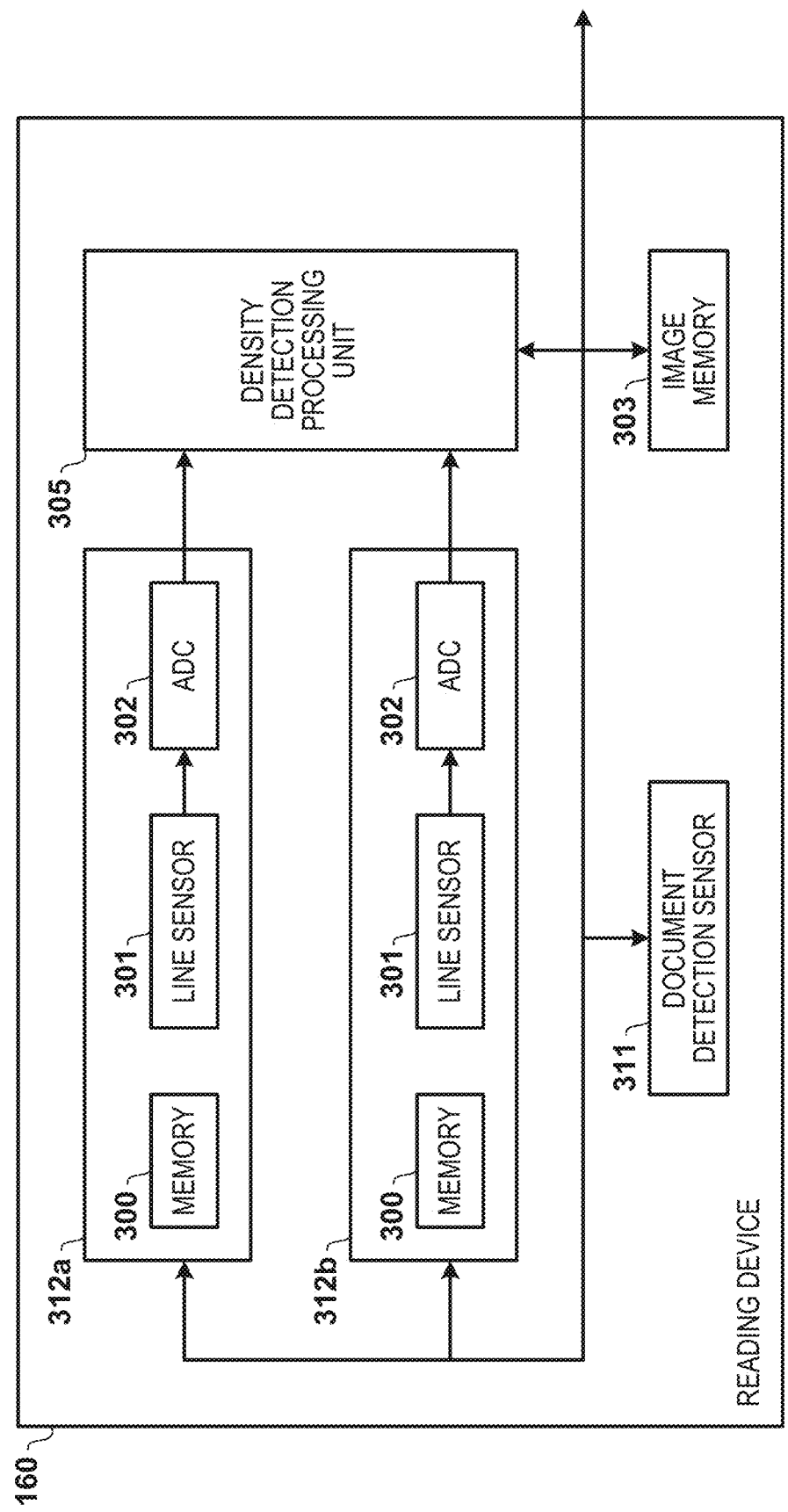
FIG. 3 is a functional block diagram of a reading device according to an embodiment.
Figure 4:
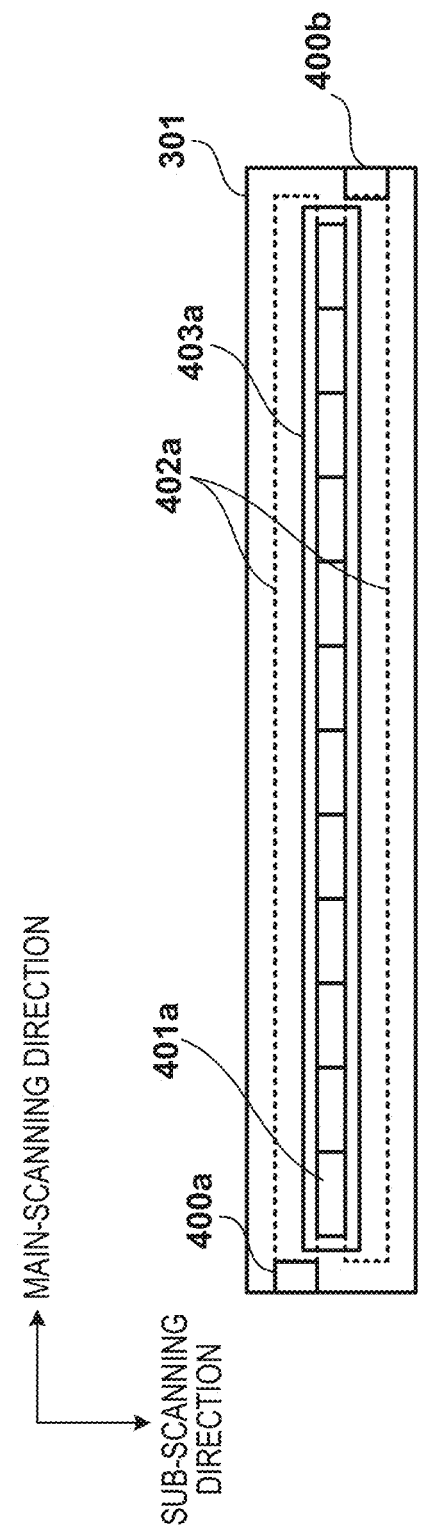
FIG. 4 is a configuration diagram of a line sensor according to an embodiment.

FIG. 3 is a functional block diagram of the reading device 160. The line sensor units 312a and 312b have a similar configuration, each including a memory 300, a line sensor 301, and an analog to digital converter (ADC) 302. The line sensor 301 is a contact image sensor (CIS), for example. FIG. 4 is a configuration diagram of the line sensor 301. LEDs 400a and 400b are light sources that emit a white light. The LEDs 400a and 400b are disposed on different ends of a light guiding member 402a in the longitudinal direction. Note that the line sensor 301 is disposed with the longitudinal direction orientated orthogonal to the sheet conveyance direction. Hereinafter, the longitudinal direction is also referred to as a main-scanning direction, and the sheet conveyance direction is also referred to as a sub-scanning direction. The light emitted by the LEDs 400a and 400b diffuses inside the light guiding member 402a in the main-scanning direction and irradiates a sheet from the entire main-scanning direction of the light guiding member 402a. Light reflected at the sheet travels through a lens array 403a and is incident on a plurality of light-receiving elements 401a disposed along the main-scanning direction. Note that the reflection positions of the reflected light incident on the light-receiving elements 401a are also referred to as pixels. The plurality of light-receiving elements 401a has a three-line configuration with a red (R), green (G), and blue (B) color filter applied. The line sensor 301 of the present embodiment has a "double-sided illumination" configuration in which light is irradiated from double sides of the lens array 403a in the sub-scanning direction.

Returning to FIG. 3, correction information for correcting variation in the amount of light in the plurality of light-receiving elements 401a of the line sensor 301 is stored in the corresponding memory 300. The line sensor 301 corrects the received light amount of the light-receiving elements 401a using correction information and outputs the corrected received light amount of the light-receiving elements 401a as received light amounts of pixel to the ADC 302, sequentially. The ADC 302 converts the analog signal output by the corresponding line sensor 301 into a digital signal and outputs this as read data to a density detection processing unit 305. The read data indicates the red (R), green (G), and blue (B) luminance value of each pixel. While a sheet is being conveyed, the line sensor 301 repeatedly reads an image corresponding to one line in the main-scanning direction to read an image of the entire sheet. The processing at the density detection processing unit 305 will be described below. An image memory 303 is used as a storage unit for storing read data when the density detection processing unit 305 executes processing.

Figure 5:
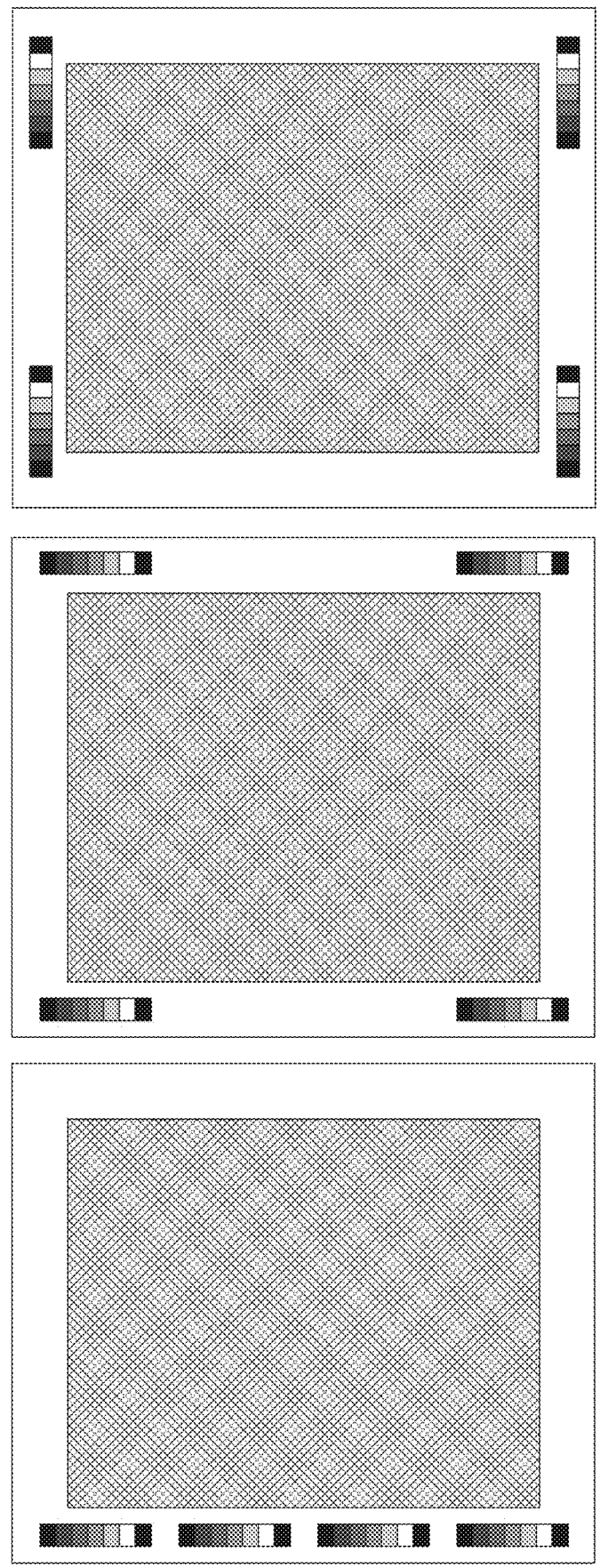
FIGS. 5A to 5C are diagram illustrating test sheets according to an embodiment.

The image forming apparatus 100 forms a test sheet for image stabilization control and makes the reading device 160 read the test sheet. Herein, test sheet is a sheet on which a user-formed image (hereinafter, referred to as user image) and a density patch is formed. FIGS. 5A to 5C are diagrams illustrating example test sheets. Note that in FIGS. 5A to 5C, the lateral direction is the main-scanning direction and the vertical direction is the sub-scanning direction. The shaded region in FIGS. 5A to 5C is the region where the user image is formed (hereinafter, referred to as user image formation region). Density patches of the four colors used in image formation are formed on the test sheet outside of the user image formation region of the sheet. Note that the density patch of each color includes a plurality of images (hereinafter, referred to as patches) of incrementally different density. In the present embodiment, the patches on opposite ends of a single density patch in the direction that the patches continue have a higher density than the other patches in the density patch. For example, the patch on one end of a single density patch has the highest density, and the patch on the other end has the second highest density. Note that the density of the patches on opposite ends of a single density patch may be the same. The region where the density patches are formed is ultimately a region removed via cutting by the finisher 190. Thus, the density patches are not included in the final product delivered to the user. Note that the density patches may be formed on both surfaces of the sheet or on only one surface of the sheet, regardless of whether the user is to be formed on only one surface or both surfaces of the sheet.

In FIG. 5A, the density patches of the four colors are disposed along the sub-scanning direction at one end portion of the sheet in the main-scanning direction. In FIG. 5B, the density patches of two colors are disposed along the sub-scanning direction at one end portion of the sheet in the main-scanning direction, and the density patches of the remaining two colors are disposed along the sub-scanning direction at the other end portion. In FIG. 5C, the density patches of two colors are disposed in the main-scanning direction at one end portion of the sheet in the sub-scanning direction, and the density patches of the remaining two colors are disposed along the main-scanning direction at the other end portion.

In a case where a test sheet is read by the reading device 160, the line sensor unit 312a and the line sensor unit 312b output read data including the user image and the density patches to the density detection processing unit 305. The density detection processing unit 305 determines the average luminance value of each patch of the density patches of each color on the basis of the read data. Also, the density detection processing unit 305 outputs the average luminance value to the controller 110. The controller 110 determines a detection density of each patch from the average luminance value of each patch and sets the image forming conditions relating to density on the basis of the density of the formed patch and the detection density. Note that the controller 110 uses the luminance value of a complementary color to determine the density of each patch. For example, the density detection processing unit 305 determines the average luminance value of the cyan, magenta, and yellow patches from the red, green, and blue luminance values. Note that the controller 110 determines the average luminance value of the black patch from the green luminance value. The density detection processing unit 305 may be implemented by a field-programmable gate array (FPGA) and/or an application specific integrated circuit (ASIC), for example.

Figure 6:
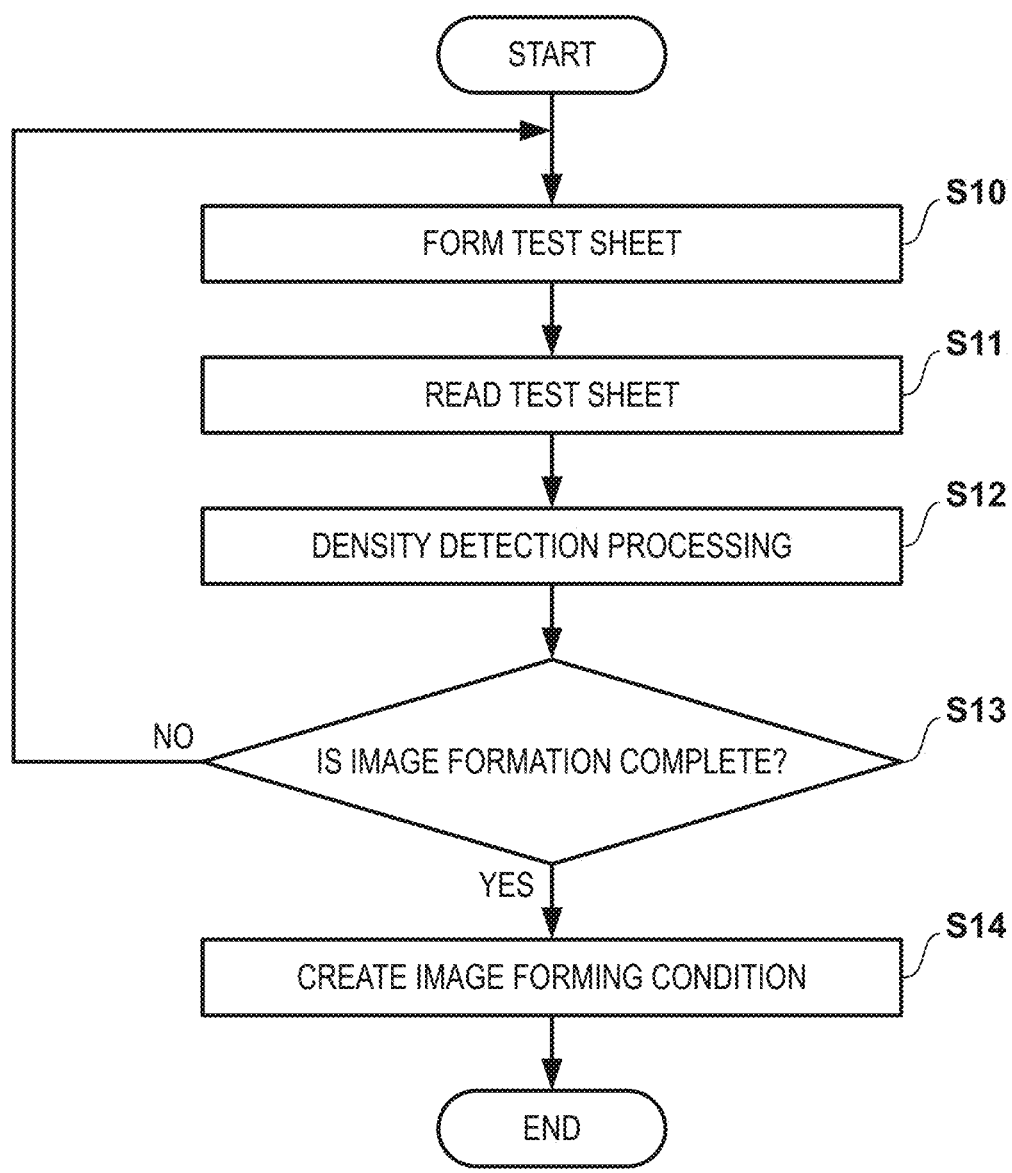
FIG. 6 is a flowchart of a process of adjusting image forming conditions according to an embodiment.

FIG. 6 is a flowchart of the process for generating the image forming conditions. The process of FIG. 6 is started when a start instruction for image formation is entered by a user via the operation panel 120. In step S10, the controller 110 forms a test sheet. Specifically, the controller 110 forms a user image on a sheet on the basis of image data and forms a density patch of each color on the sheet. In Step S11, the controller 110 controls the reading device 160 to read the test sheet. Note that the reading timing of the reading device 160 is determined on the basis of the timing at which the document detection sensor 311 detects the test sheet. In step S12, the density detection processing unit 305 outputs the average luminance values for each patch to the controller 110, and the controller 110 detects the density of each patch. In step S13, the controller 110 determine whether or not image formation is complete, or in other words, whether or not an image has been formed on all of the sheets designated by the image formation start instruction. In a case where image formation is not complete, the controller 110 repeats the process from step S10. In a case where image formation is complete, the controller 110 generates the image forming conditions for adjusting density on the basis of the density detection results of the density patches in step S12 (step S14).

Note that a density patch does not need to be formed on all of the sheets on which a user image is to be formed. In other words, one or more sheets on which a user is to be formed may be set as test sheets and density patches are formed on them. In this case, the process of step S13 corresponds to processing to determine whether or not an image has been formed on all of the test sheets.

Figure 7:
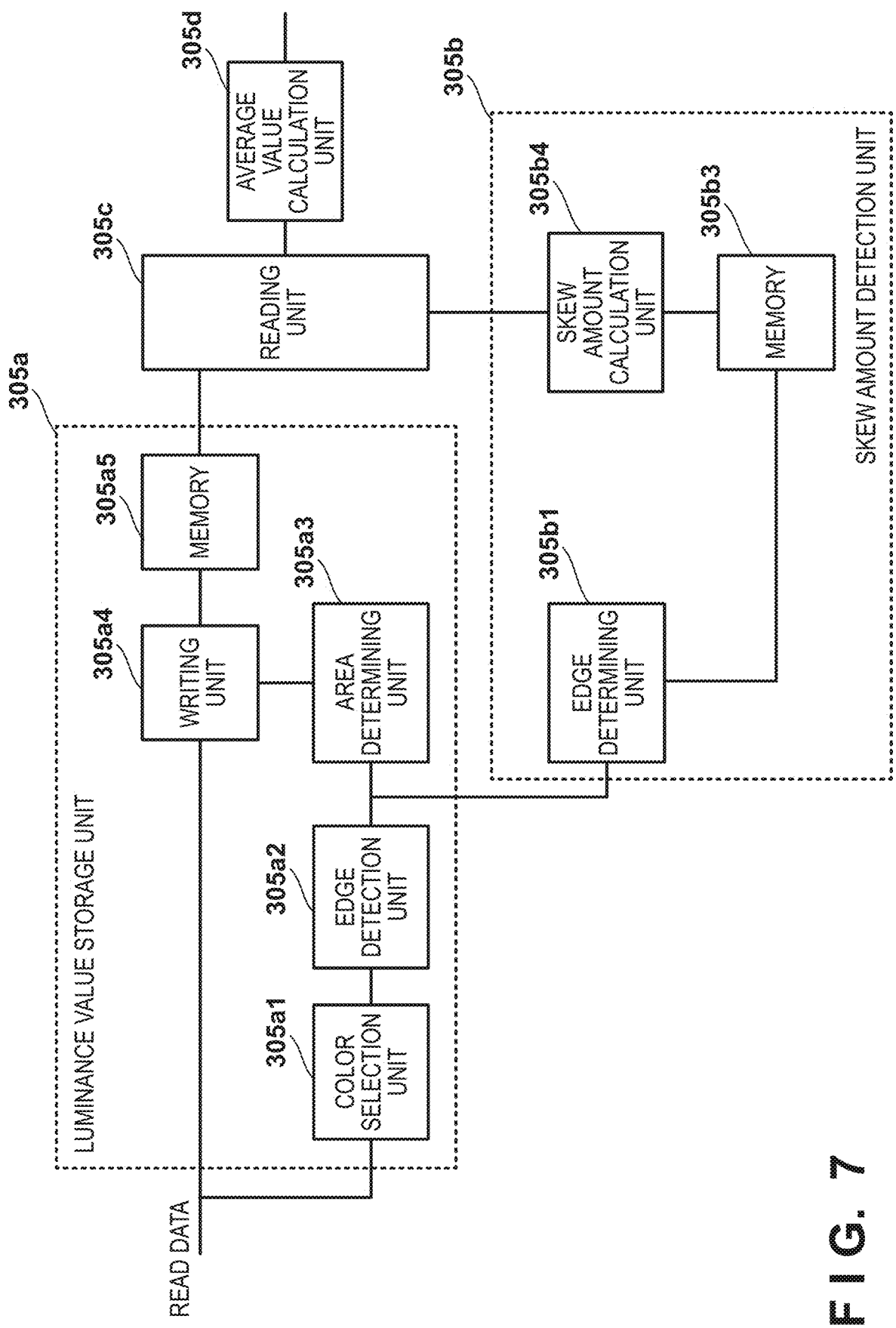
FIG. 7 is a block diagram of a density detection processing unit according to an embodiment.

Next, the processing executed by the density detection processing unit 305 will be described. FIG. 7 is a block diagram of the density detection processing unit 305. Note that the processing of the read data entered from the line sensor units 312a and 312b are the same. Thus, the processing of read data entered from one of the two line sensor units will be described with reference to FIG. 7. Note that, as described above, the line sensor 301 reads the surface of the sheet conveyed in the sub-scanning direction one line at a time. In the example described below, the sheet is read one line at a time from top to bottom as illustrated in FIGS. 5A to 5C. Also, the line sensor outputs the luminance value of each pixel of one line in order. In the example described below, the luminance value is output in order from left to right as illustrated in FIGS. 5A to 5C. Furthermore, hereinafter, up, down, right, and left correspond to up, down, right, and left as illustrated in FIGS. 5A to 5C. Also, the line number is the order of reading by the line sensor 301 reads, and the pixel number in one line is the order of output by the line sensor. Accordingly, the uppermost line is the first line, and the furthest down line is the last line. Also, the pixel furthest to the left of one line is the first pixel and the pixel furthest to the right is the last pixel.

Read data is entered into a color selection unit 305a1 and a writing unit 305a4. The color selection unit 305a1 selects a color used in edge detection by an edge detection unit 305a2 in a later stage, and outputs read data of the selected color to the edge detection unit 305a2. To increase the accuracy of the edge detection, the color selection unit 305a1 may select a color used in edge detection according to the color of the underlayer of the sheet, for example.

The edge detection unit 305a2 detects one of the two edges along the sub-scanning direction of the density patches on the basis of the read data entered from the color selection unit 305a1. In the present embodiment, the edge of the two edges in the sub-scanning direction of the density patches that is first detected, i.e., the left side edge (hereinafter, referred to as the left edge), is detected. The edge detection unit 305a2 determines the luminance values for each line in order from the first pixel, for example. The luminance of the density patches is less than the luminance of the underlayer portion of the white sheet. Thus, the edge detection unit 305a2 can detect the left edge of the density patches by detecting a drop in the luminance value in the main-scanning direction. Note that instead of detecting the left edge per line, the left edge may be detected every predetermined number of lines continuous in the sub-scanning direction and find the average of the position in the main-scanning direction of the detected edges for the predetermined number of lines to detect the left edge. Note that with this configuration, the position of the edge in the sub-scanning direction corresponds to the average position in the sub-scanning direction of the predetermined number of lines used in finding the average.

An area determination unit 305a3 determines the data area of the read data to be stored in memory 305a5 on the basis of the size of the density patches and the position in the sub-scanning direction of the left edge of the first patch detected by the edge detection unit 305a2 and informs the writing unit 305a4 of this. FIGS. 8A and 8B are each diagrams illustrating a density patch. Note that in FIGS. 8A and 8B, the vertical direction is the sub-scanning direction. The shaded region in FIG. 8A indicates the central region (test image region) used in calculating the average luminance value. As described above, to suppress flare effects, the central region of each patch of the density patch is used to calculate the average luminance value, and the region outside the shaded region, i.e., the edge region including the edge, is not used in calculating the average luminance value. The diagonal line region of FIG. 8B indicates the area of the pixel stored in the memory 305a5 by the area determination unit 305a3. As illustrated in FIG. 8B, the area determination unit 305a3 determines to store in the memory 305a5 read data corresponding to the area containing the entire region of the density patches in the main-scanning direction, which includes the same area as the central region used in calculating the average luminance value in the sub-scanning direction. The reason the area in the main-scanning direction stored in the memory 305a5 is made larger than the area used in calculating the average luminance value is to take into account cases where the density patches are inclined, as described below. Specifically, the area in the main-scanning direction stored in the memory 305a5 may be determined taking into account the maximum value of skew that may occur. Note that the reason the area in the sub-scanning direction is not made larger is because the effects of an inclination are insignificant and may be ignored. However, in other examples, the area may be made larger in the sub-scanning direction. The writing unit 305a4 writes the read data of the pixels of the area determined by the area determination unit 305a3 to the memory 305a5. In this manner, the memory 305a5 stores the luminance values of only the test image region of the density patch taking into account the skew amount and does not store the luminance value of all of the pixels of the test sheet. This reduces the amount of capacity needed by the memory 305a5.

Also, the edge detection unit 305a2 outputs the detects left edge to an edge determining unit 305b1. The edge determining unit 305b1 writes to a memory 305b3 the position of the two left edges on the basis of the plurality of left edges detected in a plurality of lines in the main-scanning direction by the edge detection unit 305a2. These two left edges may be the left edge of one line of the first patch (reference image) of one density patch and the left edge of one line of the last patch (reference image), for example. For example, the left edge first detected in one density patch and the left edge last detected may be the two left edge written to the memory 305b3. Also, in another example, the average position of the left edge of a plurality of lines detected for the first patch of one density patch and the average position of the left edge of a plurality of lines detected for the last patch of one density patch may be written to the memory 305b3 as the two left edges. As described above, the density of the first patch and the last patch of one density patch is higher than the density of the other patches of the density patch. This makes the detection accuracy of the left edge of the first patch and the last patch higher than the detection accuracy of the other patches.

Figure 9:
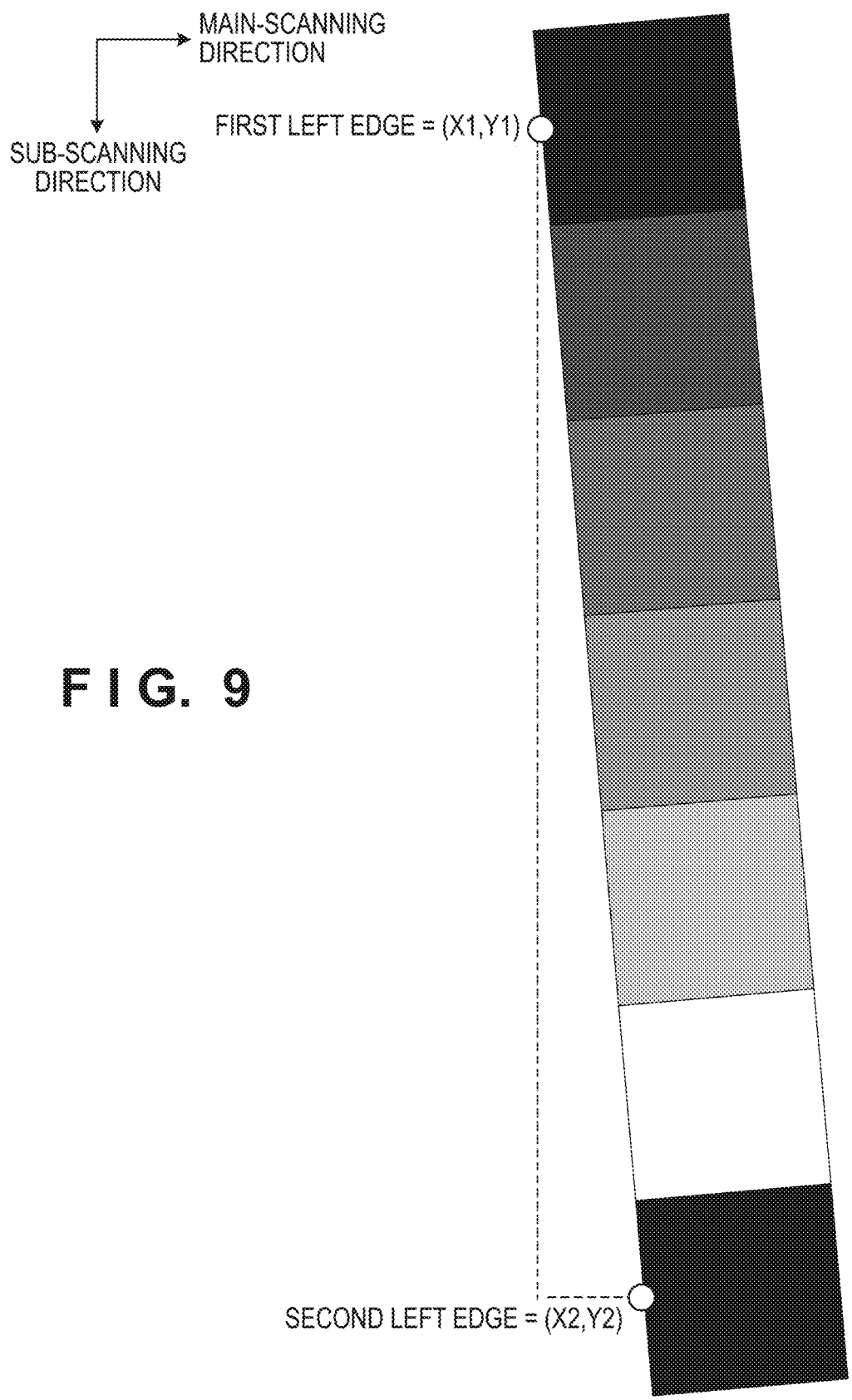
FIG. 9 is an explanatory diagram of skew amount calculation processing according to an embodiment.

A skew amount calculation unit 305b4 reads the positions of the two left edges from the memory 305b3 and calculates the skew amount of the density patch. FIG. 9 is an explanatory diagram of a method of calculating the skew amount. As illustrated in FIG. 9, the skew amount calculation unit 305b4 reads out the positions of the two left edges, a first left edge and a second left edge, from the memory 305b3. In FIG. 9, the position of the first left edge in the main-scanning direction is X1, and the position in the sub-scanning direction is Y1. Also, in FIG. 9, the position of the second left edge in the main-scanning direction is X2, and the position in the sub-scanning direction is Y2. The skew amount calculation unit 305b4 determines a skew amount θ as the inclination of the left edge of the density patch with respect to the sub-scanning direction. In other words, from FIG. 9

Skew amount $\theta = (X2-X1)/(Y2-Y1)$.

As described above, the first left edge and the second left edge are the left edges of the patches with high density. Thus, the detection accuracy is high, allowing the skew amount to be determined with high accuracy.

The reading unit 305c determines the read data corresponding to the central region (see FIG. 8A) of each patch from the read data stored in the memory 305a5 on the basis of the skew amount θ calculated by the skew amount calculation unit 305b4. Specifically, the read data of the diagonal line region of FIG. 8B is stored in the memory 305a5. Accordingly, the reading unit 305c determines the area in the main-scanning direction corresponding to the central region of each patch from the diagonal line region of FIG. 8B on the basis of the skew amount θ. Thus, the reading unit 305c moves the left position of the central region in the main-scanning direction from a reference position to the right a value S in accordance with the position of the line in the sub-scanning direction. Specifically, with the position in the sub-scanning direction defined as Y:

$S = (Y-Y1) \times \theta$

Herein, the reference position corresponds to the distance in the main-scanning direction from a position X1 in the main-scanning direction of the first left edge to the left side of the central region of the patch, for example. Note that the length read out from the left position S to the right in the main-scanning direction is determined in advance on the basis of the size of the patch in the main-scanning direction. The reading unit 305c reads out the determined read data from the memory 305a5 and outputs this to an average value calculation unit 305d.

The average value calculation unit 305d, for each patch, determines the luminance value of each pixel of the central region of the patch on the basis of the read data read out by the reading unit 305c and calculates the average luminance value of each patch by finding the average. In a case such as that illustrated in FIG. 8A where one density patch includes seven different patches, seven average luminance values are calculated from one density patch.

Figure 10:
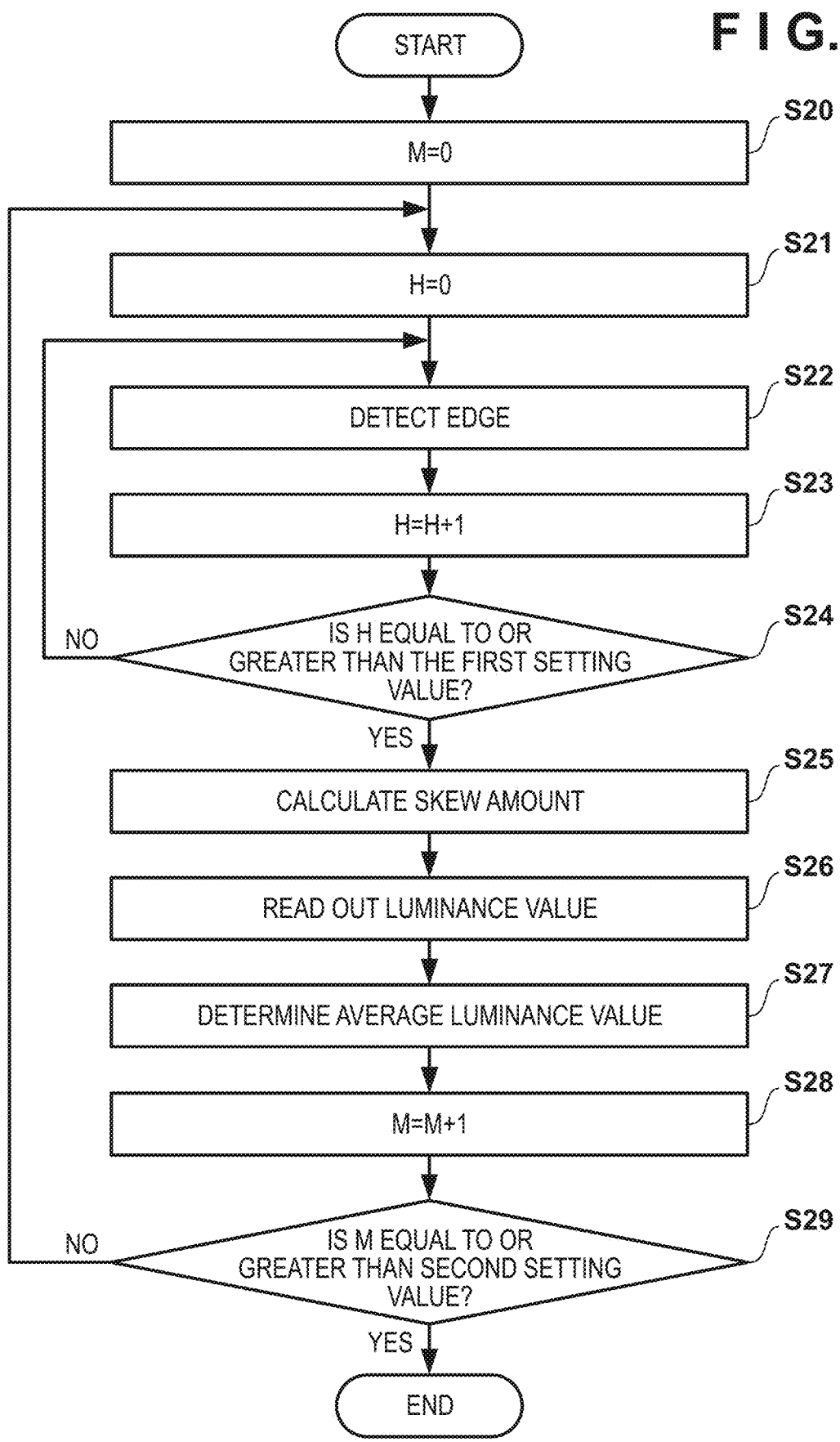
FIG. 10 is a flowchart of a process of calculating the average luminance value according to an embodiment.

FIG. 10 is a flowchart of the process relating to the density detection processing unit 305. In step S20, the density detection processing unit 305 initializes a counter M of the density patch, setting it to 0. In step S21, the density detection processing unit 305 initializes a counter H of the line, setting it to 0. In step S22, the density detection processing unit 305 detects the left edge. In step S23, the density detection processing unit 305 increases the counter H by 1. In step S24, the density detection processing unit 305 determines whether or not the counter H is equal to or greater than a first setting value. The first setting value is a value obtained by converting the length of one density patch in the sub-scanning direction to a line number and is set in advance by the density detection processing unit 305. When the line counter H is less than the first setting value, this means that all of the left edges of one density patch have not been detected. In this case, the density detection processing unit 305 repeats the process from step S22. On the other hand, when the counter H is equal to or greater than the first setting value, this means that all of the left edges of one density patch have been detected. In this case, the process proceeds to step S25, where the density detection processing unit 305 determines the skew amount as described using FIG. 9.

In step S26, the density detection processing unit 305 reads out the read data determined on the basis of the skew amount from the memory 305a5, and in step S27, the density detection processing unit 305 calculates the average luminance value of each patch. This ends the processing for one density patch. Thereafter, in step S28, the density detection processing unit 305 increases the counter M by one, and in step S29, the density detection processing unit 305 determines whether or not the counter M is equal to or greater than a second setting value. The second setting value, for one recording material, corresponds to the number of density patches to be formed in the sub-scanning direction and is set in advance by the density detection processing unit 305. When the counter M is less than the second setting value, this means that all of the density patches have not been detected. In this case, the density detection processing unit 305 repeats the process from step S21. On the other hand, when the counter M is equal to or greater than the second setting value, this means that all of the density patches have been detected. In this case, the density detection processing unit 305 ends the process illustrated in FIG. 10.

The average luminance value of each patch output by the density detection processing unit 305 is output to the controller 110. The controller 110 converts the average luminance value of each patch of the density patch of each color to a density on the basis of a luminance/density conversion table. In other words, the density of each patch is determined by each color. Also, the controller 110 determines the density characteristics (tone characteristics) of the printer 150 for each color on the basis of the density of each patch. On the basis of the determined (current) density characteristics of the printer 150, the controller 110 generates for each color a tone correction table in one-dimension for converting the input values of the image data so that the density characteristics of the printer 150 are made ideal. The controller 110 converts the image data on the basis of the tone correction table and makes the printer 150 form an image according to the converted image data. With this configuration, the difference between the density characteristics of the user image formed by the printer 150 and the ideal density characteristics can be decreased.

Note that the image forming conditions to be adjusted are not limited to being a tone correction table and may be other image forming conditions relating to density to be adjusted. For example, the controller 110 may control, on the basis of a detection result of the density patches, at least one: of charging bias of the charging device 220 of the printer 150, exposure intensity of the exposure device 223, or development bias of the developing device 152.

Furthermore, in the present embodiment, the image forming conditions are generated/set using the density after converting the luminance value indicative of the read data into density. However, the image forming conditions may be generated/set directly from the average luminance value.

In the image forming apparatus of the present embodiment described above, the skew amount of the density patch with respect to the line sensor unit is detected, and the central region of each patch of the density patch is determined on the basis of the skew amount. This configuration allows the density patch to be read with high accuracy while suppressing the effects of flare. Also, by adjusting the image forming conditions on the basis of the read data corresponding to the central region, an image with stable density can be output. Note that according to the present invention, an image reading apparatus is provided. An image reading apparatus corresponding to the reading device 160 detects the skew amount of the density patch with respect to the line sensor unit and determines the central region of each patch of the density patch on the basis of the skew amount. Also, the average luminance value of each patch is output on the basis of the luminance value of the central region. Furthermore, an image reading apparatus can convert the average luminance value into density and generate/set image forming conditions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-086905, filed May 18, 2020, which is hereby incorporated by reference herein in its entirety.

What is claimed is:

1. An image reading apparatus comprising:
a conveyance path through which a sheet having a plurality of test images passes;
a reading unit arranged in the conveyance path, the reading unit being configured to read an image of the sheet while the sheet is conveyed in the conveyance path;
a controller configured to:
obtain the image of the sheet read by the reading unit;
determine an inclination of a direction in which the plurality of test images are arranged with respect to a predetermined direction based on the image of the sheet read by the reading unit;
perform image processing to the image of the sheet read by the reading unit based on the inclination of the direction to determine read data related to the plurality of test images; and
output the read data.

2. The image reading apparatus according to claim 1, wherein the reading unit has a line sensor, and
wherein the predetermined direction intersects with a longitudinal direction of the line sensor.

3. The image reading apparatus according to claim 2, wherein the controller detects edges of the plurality of test images in the longitudinal direction of the line sensor based on the image of the sheet read by the reading unit, and
wherein the controller determines the inclination of the direction in which the plurality of test images are arranged with respect to the predetermined direction based on the edges of the plurality of test images.

4. An image forming apparatus comprising:
an image forming unit configured to form an image on a sheet based on an image forming condition;
a conveyance path through which a sheet having a test image passes, the test image being formed by the image forming unit;
a reading unit arranged in the conveyance path, the reading unit being configured to read the test image on the sheet while the sheet having the test image is conveyed in the conveyance path;
a controller configured to:
control the image forming unit to form a plurality of test images on a sheet;
control the reading unit to read the plurality of test images on the sheet;
determine an inclination of a direction in which the plurality of test images are arranged with respect to a predetermined direction based on a reading result of the plurality of test images by the reading unit; and
control the image forming condition based on the reading result of the plurality of test images by the reading unit and the inclination of the direction.

5. The image forming apparatus according to claim 4, wherein the reading unit has a line sensor, and
wherein the predetermined direction intersects with a longitudinal direction of the line sensor.

6. The image forming apparatus according to claim 5, wherein the controller detects edges of the plurality of test images in the longitudinal direction of the line sensor based on the reading result of the plurality of test images by the reading unit, and
wherein the controller determines the inclination of the direction in which the plurality of test images are arranged with respect to the predetermined direction based on the edges of the plurality of test images.

7. The image forming apparatus according to claim 4, wherein the image forming unit forms the image and the plurality of test images on a same sheet, and
wherein the plurality of test images are formed outside of a region where the image is formed on the same sheet.

* * * * *